United States Patent

Tonies et al.

[15] 3,646,328

[45] Feb. 29, 1972

[54] METHOD AND APPARATUS UTILIZING UNIQUE CDAB SEQUENCE FOR CORRECTING SYNCHRONIZATION ERROR IN RAILWAY VEHICLE READOUT SIGNAL

[72] Inventors: Lawrence A. Tonies; James R. Teasdale, both of Grayslake, Ill.

[73] Assignee: Mangood Corporation, Chicago, Ill.

[22] Filed: Feb. 27, 1970

[21] Appl. No.: 15,068

[52] U.S. Cl. ....................235/92 TC, 177/163, 177/DIG. 8, 246/77, 235/92 R, 235/92 EV, 235/92 WT

[51] Int. Cl. ....................B61l 1/16

[58] Field of Search....................235/92 TC, 92 EV, 92 WT, 340/146.3 K; 177/DIG. 8, 1, 163; 246/77

[56] References Cited

UNITED STATES PATENTS

| | | | |
|---|---|---|---|
| 3,374,844 | 3/1968 | Rogers | 177/163 |
| 3,486,008 | 12/1969 | Mori | 235/92 |
| 3,500,039 | 3/1970 | Kortyna | 246/77 |

*Primary Examiner*—Maynard R. Wilbur
*Assistant Examiner*—Robert F. Gnuse
*Attorney*—Horton, Davis, McCaleb & Lucas

[57] ABSTRACT

Method and apparatus for correcting synchronization error in a system for synchronizing a readout signal with some unique axle count condition in a train of standard railway vehicles coupled and in motion. Axle movement are detected at four locations identified as A, B, C and D in that order, in the direction of movement of the train, locations A and D being between 9 feet 4 inches and 11 feet apart for the axle spacings employed on standard American railway vehicles. Other A to D spacings may be used where axle spacings differ from current American practice. Axle movements are counted at A and D locations and the system remains in synchronism as long as the first axle of each vehicle is counted starting with a one-count regardless of the number of axles in the previous vehicle. If synchronized, when axles pass the locations in the proximate CDAB sequence, axle counts at A and D will have the following unique combinations:

A=3, D=2 for 4-axle vehicles;
A=4, D=3 for 6-axle vehicles;
A=5, D=4 for 8-axle vehicles; and
A=1, D=0 for uncoupled and certain long-coupled vehicles.

If out of synchronism, the system is resynchronized according to the present invention by detecting the unique CDAB sequence and repeatedly, if necessary, setting the A and D counts to one of the above unique combinations until a vehicle identified by such combination moves past the detector locations.

15 Claims, 1 Drawing Figure

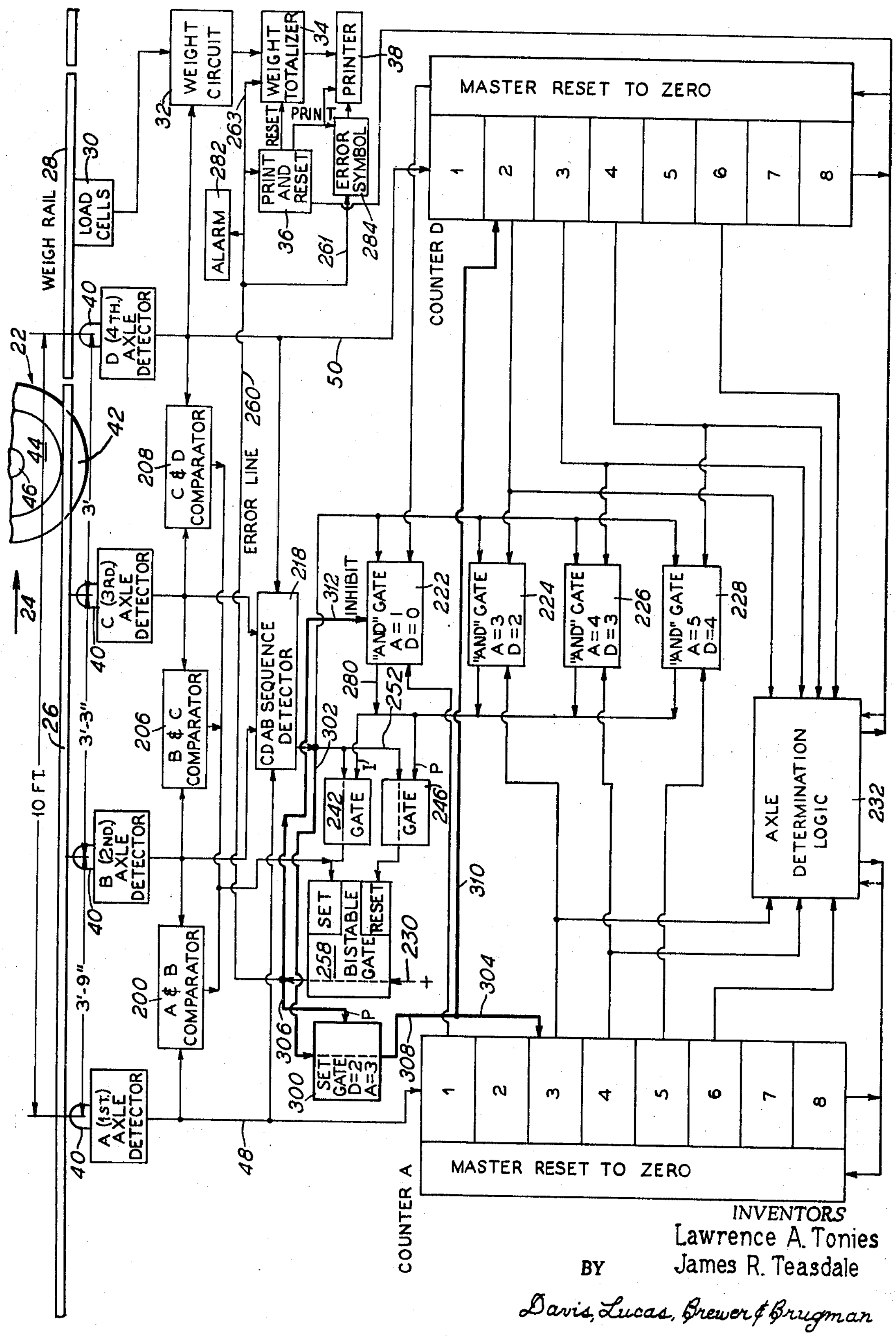
INVENTORS
Lawrence A. Tonies
James R. Teasdale
BY *Davis, Lucas, Brewer & Brugman*
ATTORNEYS

METHOD AND APPARATUS UTILIZING UNIQUE CDAB SEQUENCE FOR CORRECTING SYNCHRONIZATION ERROR IN RAILWAY VEHICLE READOUT SIGNAL

If out of synchronism, the system is resynchronized according to the present invention by detecting the unique CDAB sequence and repeatedly, if necessary, setting the A and D counts to one of the above unique combinations until a vehicle identified by such combination moves past the detector locations.

CROSS-REFERENCES TO RELATED APPLICATIONS

Reference is made to the following related patent applications, assigned to the same assignee, filed concurrently with this application:

Tonies application Ser. No. 15,066, filed Feb. 27, 1970, on "METHOD AND APPARATUS FOR GENERATING A READOUT SIGNAL SYNCHRONIZED WITH RAILWAY VEHICLE MOVEMENT";

Tonies and Teasdale application Ser. No. 15,067, filed Feb. 27, 1970, on "METHOD AND APPARATUS UTILIZING UNIQUE CDAB SEQUENCE FOR DETECTING SYNCHRONIZATION ERROR IN RAILWAY VEHICLE READOUT SIGNAL";

Tonies application Ser. No. 15,140, filed Feb. 27, 1970; on "METHOD AND APPARATUS FOR IDENTIFYING ENGINES IN A TRAIN OF RAILWAY VEHICLES";

Tonies application Ser. No. 15,141, filed Feb. 27, 1970, on "SEQUENCE DETECTOR FOR RAILWAY VEHICLE CONTROL SYSTEM"; and Bailey application Ser. No. 15,142, filed Feb. 27, 1970, on "CIRCUIT FOR SIGNALING ALTERNATION ERROR IN DETECTORS FOR RAILWAY VEHICLE CONTROL SYSTEM."

BACKGROUND OF THE INVENTION

The field of invention includes weighing of railroad vehicles, while coupled and in motion, as well as detecting and recording other information about railroad cars and engines.

Identification of railroad cars while coupled and in motion is complicated by the fact that, although axle and coupling spacings are standardized within known limits, and with rare exceptions a car or engine will have either four, six or eight axles of various standard spacings, these are generally mixed at random in a train. This complicates the problem of identifying vehicles simply by counting their axle assemblies which of course are the only elements of a railway car or engine in contact with the rails.

This invention is particularly applicable in single- or multidraft weighing of railway vehicles in which individual axle or truck assemblies, or an entire car or engine, are weighed and suitably totalized and printed out or displayed in response to a readout signal which coincides with weighing of the last axle or truck, or of the entire vehicle. The railway vehicles may be coupled or uncoupled and in motion, or stationary on a weigh scale.

The weighing of railway cars while in motion, whether coupled or uncoupled, on a commercial scale, is a development of the last few years and where this is done regularly for trains of mixed four-, six- and eight-axle vehicles, individual vehicles are identified with relatively complicated apparatus requiring special installation and maintenance techniques. Roeser U.S. Pat. No. 2,543,806 and Gordon U.S. Pat. No. 3,063,635 shows systems and circuits which have been developed for weighing of railway cars while coupled and in motion. Prior to the present invention, a simple, reliable system has been needed to identify each car or engine in such a mixed train.

Although this invention may be applied to many forms of weighing, multidraft, single-draft, coupled or uncoupled, the method illustrated in this application is multidraft, axle-by-axle. A relatively short weigh scale is used. The weights of individual trucks or axles are stored in the memory bank of a weight circuit, and totalized, and the total weight of all trucks or axles for each vehicle is printed or displayed in response to a readout signal when the last truck or axle is weighed.

It is critically important that this readout signal occur when the last truck or axle is on the weigh rail, otherwise the weight circuit would totalize the weights of trucks or axles from adjacent cars and provide a meaningless reading.

Likewise, in any system for synchronizing a readout signal per vehicle, where the system counts axles and activates the readout signal in response to any condition that depends on an accurate count of the axles per vehicle, it is essential that there be some simple, and preferably automatic, method and apparatus for correcting a synchronization error.

BRIEF SUMMARY OF THE INVENTION

Broadly, the object of the present invention is to provide a method, which can be manually, or by automatic apparatus, to correct synchronization error in a readout signal that is synchronized with axle count per vehicle in a train of standard railway vehicles coupled and in motion. It may be used with any such system where the readout signal triggers the printing or display of any kind of information about a railway car or engine such as weight, destination, origin, owner, load or other desired information.

In this specific application, the invention is described in connection with a multidraft, axle-by-axle weighing system but it will be understood that this is merely by way of example and that the invention may be used with any other system for obtaining information about individual vehicles in a train of standard railway vehicles, coupled or uncoupled and in motion.

We have discovered that, by detecting axle movements at four spaced locations along the line of movement of a train, and if the first and fourth locations are precisely spaced no less than 9 feet 4 inches and no more than 11 feet apart, axles of standard railway vehicles will pass these locations in a unique, third+fourth+first+second sequence (herein referred to as the "CDAB sequence") once per vehicle, whether it be a car or engine, and whether it has four, six or eight axles. This precise spacing will of course be different in countries where the standard axle spacings differ from American practice, and for use in special applications where axle spacings differ from standard railway practice.

We have also discovered that, if the system is in synchronization, that is, it counts each vehicle axle starting with a one-count for the first axle of each vehicle, a unique combination of axle counts will exist at the first and fourth detector locations. Specifically, identifying the first, second, third and fourth locations as A, B, C and D, respectively, axle count combinations at the instant the CDAB sequence occurs should be as follows if the system is synchronized:

$A=3$, $D=2$ for a four-axle vehicle;
$A=4$, $D=3$ for a six-axle vehicle;
$A=5$, $D=4$ for an eight-axle vehicle;
$A=1$, $D=0$ for uncoupled and certain long-coupled vehicles.

Utilizing these discoveries, we have developed a very simple and reliable method and apparatus for resynchronizing when the axle count gets out of step with the axles on any vehicle. Briefly, depending generally on the number of axles per vehicle which predominate (in general use there are far more four-axle vehicles), an assumption is made that the next vehicle will have a certain number of axles. If we know that the system is out of synchronization, as for example, by a synchronization error signal generated by a circuit shown in our copending application, Ser. No. 15,067, identified above, we resynchronize as follows: when a CDAB sequence occurs we change the axle count at locations *A* and *D* to whatever would be proper for the kind of vehicle mostly in use (say four-axle vehicles), and we repeat this until such vehicle passes the detector locations at which time the system returns to proper synchronization.

A specific object is to provide four axle detectors identified *A*,B, C and *D*,more or less evenly arranged along the direction of movement of the train and spaced overall precisely between 9 feet 4 inches and 11 feet; provide counters *A* and *D* for the first and fourth detectors together with means for changing the count reading on each counter; provide a sequence detector to sense the unique CDAB sequence; and provide control means for changing the combinations on the counters to $A=3$, $D=2$; $A=4$, $D=3$; or $A=5$, $D=4$, depending on which kind of vehicle is used mostly in the particular installation.

Other objects and advantages will be apparent from the following description taken in connection with the drawing which is a schematic representation of a preferred circuit for carrying out the present invention.

Referring now in detail to the drawing, a railway vehicle axle assembly 22, carried by a car or engine (not shown), is movable along a line of train movement indicated by arrow 24. Railway tracks 26 include a small weigh rail section 28 which may be between 4 feet and 4½ feet long.

As pointed out above, a readout signal synchronized with or otherwise related to axle count per vehicle may be used to trigger the printout or display of many kinds of information about a railway vehicle. Here, it is illustrated with a multidraft, axle-by-axle weighing system which forms no part of the present invention but which provides one specific application of its use.

To fully present one complete environment in which the present invention may be used, we have included in the drawing a block 232 representing an axle identification logic which identifies the number of axles per vehicle and resets counters *A* and *D* so they will be synchronized with the true axle arrangement on each vehicle. In other words, logic 232 controls each counter so it starts with a one-count on the first axle of each vehicle. This then controls weight circuit 32 to weigh each axle of each car or engine and controls the weight totalizer 34 to send the accumulated, totalized weights of all axles on each vehicle to the printer 38, whether the vehicle has four, six or eight axles and whether four-, six- or eight-axle cars and engines are mixed in any way in the train. The axle determination logic 232 and associated circuits will not be described in detail here because they have been described in the above-mentioned copending Tonies application, Ser. No. 15,066, to which reference may be had for details.

Also, to fully present the environment, two methods of error detection are shown, these being the same as disclosed in our above-mentioned copending application, Ser. No. 15,067, to which reference may be made for details. For the present purpose it is sufficient to state that, if either of the counters *A* or *D* becomes nonsynchronized with the axle positions on any vehicle moving past the *A* or *D* detectors, an error signal will instantly appear in error line 260. This will set off the alarm 282 and command the printer 38 to print an error symbol instead of a weight. The error signal will persist in line 260 until the system is resynchronized.

The purpose of this invention, as stated, is to automatically resynchronize the system when an error signal appears in line 260.

The components for accomplishing this will now be described.

The circuit in the drawing is essentially a repeat of that shown in FIG. 1 of our copending application, Ser. No. 15,067, with the components and connections forming the subject of this invention being shown in slightly heavier lines.

The apparatus includes first, second, third and fourth axle detectors identified by the letters *A*,B, C and *D* respectively. In a preferred form which has worked well in practice, detectors *A* and *D* are 10 feet apart as shown although they may be spaced as close as 9 feet 4 inches and as far as 11 feet to obtain the benefits of this invention. The four detectors are spaced along the line of movement of the train. One arrangement which has worked well in practice is that shown, namely spacing *A* and B 3 feet 9 inches apart, B and C 3 feet 3 inches apart, and *C* and *D* 3 feet apart. Each axle detector may be any suitable means for detecting the arrival, presence, or passage of an axle assembly and may be responsive to magnetic, inductive, capacitive, electrical or mechanical characteristics of an axle or wheel. In the present case, each of the detectors is in the nature of an electrical switch and includes a plunger 40 engageable by the wheel flange 42 on the wheel 44 carried by axle 46, to depress the plunger and activate the corresponding detector *A*,B, C or *D*. Each of the counters *A* and *D* is associated with a corresponding one of the detectors *A* and *D*, obtaining actuation signals respectively through the lines 48 and 50, all of which is described in the copending applications referred to above.

Each of counters *A* and *D* will be programed by the axle determination logic 232 to count one, two, three and four and reset to zero when a four-axle vehicle moves past the detectors. Each counter will count from one to six and reset when a six-axle vehicle is counted. And each counter will run through its full count of one through eight and reset for eight-axle vehicles.

The CDAB sequence detector 218 is described in detail in copending Tonies application, Ser. No. 15,141, to which reference may be made for details. Briefly, when any vehicle, whether it be an engine or a car, and whether it has four, six or eight axles, passes along the detectors *A* through *D*, a unique sequence of actuation of the detectors will occur just once per vehicle, when the vehicle is approximately midway over the detectors. This will be the sequence in which detectors C, *D*, *A*, and B are actuated, one after the other, in that order, this being referred to here, for short, as the "CDAB sequence." This will place a "CDAB sequence signal" in line 302 leading to the set gate 300.

The set gate 300 and its associated components is the means for controlling the circuit to automatically resynchronize when an error appears in error line 260. This is effective, in response to the CDAB sequence signal appearing in line 302 leading to set gate 300, coinciding with the error signal in line 260.

As stated, at the instant the CDAB sequence signal appears in line 302, the *A* count totalizer will read 3 and the *D* count totalizer will read 2 if the vehicle has four axles and the system is synchronized. Counter *A* will read 4 and counter *D* will read 3 for a six-axle vehicle synchronized. And counter *A* will read 5 and counter *D* will read 4 for an eight-axle vehicle synchronized.

By assuming that the car or engine on which the error occurred, and the ones which immediately follow, are of the kind which are most numerous in the train, if an error condition exists we set the *A* and *D* counters to the particular combinations which they should have at the instant of the CDAB sequence, and repeat this, if necessary, until resynchronization occurs which will be evidenced by extinguishing of the error signal in line 260.

If four-axle cars are most numerous, as in the case assumed in the drawing, set gate 300 will change the *A* count totalizer to read 3 and the *D* count totalizer to read 2 at the instant the CDAB sequence coincides with an error condition. If that vehicle was a four-axle vehicle, and the assumption was correct, this will place the system back in synchronization which will be verified on the next CDAB sequence signal at which time the error signal in line 260 will extinguish.

By way of explanation of nomenclature, the word "PERMIT" or letter "P" on the gate control line 306 means that a signal on that line permits the CDAB sequence signal in line 302 to pass through the gate 300 into lines 308, 304 and 310.

In the present case when we have made the four-axle assumption, a signal appearing in line 304 will change counter *A* to read 3 (through change means not specifically shown); and a signal appearing in line 310 will change counter *D* to read 2 (by similar means not shown).

There is one condition in which the CDAB sequence can occur, normally, without the center of the vehicle being over the detectors *A–D*. This is where the coupling distance between adjacent cars is more than the *A–D* distance (a very rare, and disappearing situation); and in so-called "hump" weighing where cars are uncoupled and rolled one by one down an incline containing the detectors and scale. In either of these cases, the CDAB sequence occurs between cars. Since it is not desired to resynchronize between cars, the error signal coming through bistable gate 258 will immediately be extinguished by a signal in inhibit line 312. This functions as will now be described briefly. The coincidence of counter *A* reading 1 and counter *D* reading 0, at the time the CDAB sequence signal occurs, normally results in a signal in output line 280. This, through control gates 242 and 246 prevents the error signal from passing through bistable gate 300. However, when the inlet line 312 carries the error signal to gate 222, it inhibits the output of that gate, even though the *A* and *D* counters read 1 and 0 respectively. Thus, signal in line 280 is blocked. This allows the error signal to persist in line 260 until it is extinguished when the next appropriate car center is over the detectors.

If there is a special condition which results in most of the cars being six-axle cars, then it will be preferable to resynchronize on six-axle assumption. This would be carried out simply by connecting line 304 and 310 to set counters *A* and *D* respectively to read 4 and 3 when these lines are energized. Similarly, in a special situation where most of the cars are eight-axle vehicles, an eight-axle assumption circuit may be provided by connecting line 304 to reset counter *A* to read 5 when energized, and connecting line 310 to reset counter *D* to read 4 when energized. The circuit should be made sufficiently adjustable that such change to operating conditions may be accommodated merely by a simple transposition of lines.

As stated, the initial and final axle detectors *A* and *D* should be spaced between 9 feet 4 inches and 11 feet apart to function with the standard axle spacings employed in standard American railway vehicles. Other spacings may be used where railway vehicle axle spacings differ from those in current, standard American railway practice. Broadly, to function in accordance with the present invention, detectors *A* and *D* are spaced apart less than the minimum distance between inner axles on trucks at opposite ends of a standard railway vehicle (11' in certain ore cars, for example), and more than the maximum distance between adjacent axles on any one truck of a standard railway vehicle (9' in certain engines).

I claim as my invention:

1. A method of correcting synchronization error in a system for synchronizing a readout signal per vehicle, for a train of standard railway vehicles coupled and in motion, which system counts axles and activates the readout signal in response to a unique axle count condition per vehicle, comprising the steps of:

a. detecting the movements of axles at first, second, third and fourth locations in the direction of movement of the train, identified herein as locations *A*,B, C and *D;*
b. detecting axle movements at said locations in a unique CDAB sequence which completes once per vehicle when the center of each vehicle is at said locations;
c. counting axle movements per vehicle at each of *A* and *D* starting with a one-count for the first axle on each vehicle; and
d. making a revision in the axle count at *A* and *D*, when the CDAB sequence completes, to change the axle count to a predetermined combination proper for a four-, six- or eight-axle vehicle if the system were synchronized, and repeating said axle count revision on completion of subsequent CDAB sequences until the system is resynchronized.

2. The method according to claim 1 in which the first and fourth locations are spaced apart less than the minimum distance between inner axles on trucks at opposite ends of a standard railway vehicle, and more than the maximum distance between adjacent axles on any one truck of a standard railway vehicle.

3. In a system for synchronizing a readout signal per vehicle, for a train of standard railway vehicles coupled and in motion, which system counts axles and activates the readout signal in response to a unique axle count condition per vehicle, in which the revision in step (d) changes the axle counts to $A=3$, $D=2$ when the CDAB sequence occurs on the assumption that one or more following vehicles will be four-axle vehicles.

4. In a system for synchronizing a readout signal per vehicle, for a train of standard railway vehicles coupled and in motion, which system counts axles and activates the readout signal in response to a unique axle count condition per vehicle, the resynchronization method of claim 1 in which the revision in step (d) changes the axle counts to $A=4$, $D=3$ when the CDAB sequence occurs, on the assumption that one or more following vehicles will be six-axle vehicles.

5. In a system for synchronizing a readout signal per vehicle, for a train of standard railway vehicles coupled and in motion, which system counts axles and activates the readout signal in response to a unique axle count condition per vehicle, the resynchronization method of claim 1 in which the revision in step (d) changes the axle counts to $A=5$, $D=4$ when the CDAB sequence occurs, on the assumption that one or more following vehicles will be eight-axle vehicles.

6. In a system for synchronizing a readout signal per vehicle, for a train of standard railway vehicles coupled and in motion, which system counts axles and activates the readout signal in response to a unique axle count condition per vehicle, in which *A* and *D* are spaced between 9 feet 4 inches and 11 feet apart.

7. In a system for synchronizing a readout signal per vehicle, for a train of standard railway vehicles coupled and in motion, which system counts axles and activates the readout signal in response to a unique axle count condition per vehicle, apparatus for correcting synchronization error comprising:

first, second, third and fourth axle detectors arranged in the direction of movement of the train, identified herein as detectors *A*,B, C and *D* and being spaced along the line of movement of the train;

a counter for each of detectors *A* and *D* effective to count and totalize the number of axles passing each corresponding detector, these counters being identified herein as counters *A* and *D*, each counter having change means actuatable to change the count thereon;

axle identification logic effective to program each counter to reset after it has counted all the axles on a vehicle beginning with a one-count for the first axle on each vehicle;

error signal means activatable in response to synchronization error between either of the counters and the axles of a vehicle;

a sequence detector effective to sense actuation of said detectors in a unique CDAB sequence which completes once per vehicle when the center of each vehicle is at the detector locations; and control means effective in response to activation of said error signal means coincident with completion of the unique CDAB sequence to actuate the change means on the counters to change the counts to a predetermined combination which would be proper for a standard railway vehicle if the system were synchronized.

8. Apparatus according to claim 7 in which the first and fourth axle detectors are spaced apart less than the minimum distance between inner axles on trucks at opposite ends of a standard railway vehicle, and more than the maximum distance between adjacent axles on any one truck of a standard railway vehicle.

9. In a system for synchronizing a readout signal per vehicle, for a train of standard railway vehicles coupled and in motion, which system counts axles and activates the readout signal in response to a unique axle count condition per vehicle, the apparatus for correcting synchronization error according to claim 7 in which the control means is effective in response to the CDAB sequence to actuate the change means on the counters to change the counts to a predetermined combination proper for a four-axle vehicle, on the assumption that the following vehicle will be a four-axle vehicle.

10. In a system for synchronizing a readout signal per vehicle, for a train of standard railway vehicles coupled and in motion, which system counts axles and activates the readout signal in response to a unique axle count condition per vehicle, the apparatus according to claim 9 in which the predetermined count combination is a 3-total on the *A* counter and a 2-total on the *D* counter.

11. In a system for synchronizing a readout signal per vehicle, for a train of standard railway vehicles coupled and in motion, which system counts axles and activates the readout signal in response to a unique axle count condition per vehicle, the apparatus for correcting synchronization error according to claim 7 in which the control means is effective in response to the CDAB sequence to actuate the change means on the counters to change the counts to a predetermined combination proper for a six-axle vehicle, on the assumption that the following vehicle will be a six-axle vehicle.

12. In a system for synchronizing a readout signal per vehicle, for a train of standard railway vehicles coupled and in motion, which system counts axles and activates the readout signal in response to a unique axle count condition per vehicle, the apparatus according to claim 11 in which the predetermined count combination is a 4-total on the *A* counter and a 3-total on the *D* counter.

13. In a system for synchronizing a readout signal per vehicle, for a train of standard railway vehicles coupled and in motion, which system counts axles and activates the readout signal in response to a unique axle count condition per vehicle, the apparatus for correcting synchronism error according to claim 7 in which the control means is effective in response to the CDAB sequence to activate the change means in the counters to change the counts to a predetermined combination proper for an eight-axle vehicle, on the assumption that the following vehicle will be an eight-axle vehicle.

14. In a system for synchronizing a readout signal per vehicle, for a train of standard railway vehicles coupled and in motion, which system counts axles and activates the readout signal in response to a unique axle count condition per vehicle, the apparatus according to claim 13 in which the predetermined count combination is a 5-total on the *A* counter and a 4-total on the *D* counter.

15. In a system for synchronizing a readout signal per vehicle, for a train of standard railway vehicles coupled and in motion, which system counts axles and activates the readout signal in response to a unique axle count condition per vehicle, the apparatus according to claim 13 in which detectors *A* and *D* are spaced between 9 feet 4 inches and 11 feet apart.

* * * * *

PO-1050
(5/69)

UNITED STATES PATENT OFFICE
CERTIFICATE OF CORRECTION

Patent No. 3,646,328 Dated February 29, 1972

Inventor(s) Lawrence A. Tonies and James R. Teasdale

It is certified that error appears in the above-identified patent and that said Letters Patent are hereby corrected as shown below:

Abstract, line 4, change "movement" to --movements--.
Col. 1, lines 4-9, delete all five lines.
Col. 2, line 15, after "be" insert --practiced--.
Col. 5, line 69, change "In" to --The synchronization error correction method of Claim 1 in--.
Col. 6, line 17, change "In" to --The synchronization error correction method of Claim 1 in--.

Signed and sealed this 18th day of July 1972.

(SEAL)
Attest:

EDWARD M.FLETCHER,JR.
Attesting Officer

ROBERT GOTTSCHALK
Commissioner of Patents